United States Patent
Spanner

(10) Patent No.: US 11,198,201 B2
(45) Date of Patent: Dec. 14, 2021

(54) POSITIONING DEVICE

(71) Applicant: MAGNA STEYR Fahrzeugtechnik AG & Co KG, Graz (AT)

(72) Inventor: Gerhard Spanner, Ilz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 185 days.

(21) Appl. No.: 16/560,038

(22) Filed: Sep. 4, 2019

(65) Prior Publication Data

US 2020/0101572 A1 Apr. 2, 2020

(30) Foreign Application Priority Data

Sep. 27, 2018 (EP) .................................. 18197206

(51) Int. Cl.
*B23Q 3/18* (2006.01)
*B23Q 3/00* (2006.01)

(52) U.S. Cl.
CPC ............. *B23Q 3/183* (2013.01); *B23Q 3/005* (2013.01)

(58) Field of Classification Search
CPC .......... B23Q 3/18; B23Q 3/183; B23Q 3/186; B23Q 3/005; B23Q 3/107
See application file for complete search history.

(56) References Cited

U.S. PATENT DOCUMENTS

2005/0006834 A1* 1/2005 Mulder .................. F15B 15/24
269/320

FOREIGN PATENT DOCUMENTS

| DE | 3919077 C1 | 7/1990 |
|---|---|---|
| DE | 202016101411 U1 | 6/2017 |
| DE | 102016122090 A1 | 5/2018 |
| EP | 0911112 A1 | 4/1999 |
| WO | 2004004977 A2 | 1/2004 |

OTHER PUBLICATIONS

Extended European Search Report for European Patent Application No. 18197206.8, dated Mar. 21, 2019, 4 pages.

* cited by examiner

*Primary Examiner* — Tyrone V Hall, Jr.
(74) *Attorney, Agent, or Firm* — Jordan IP Law, LLC; Todd A. Vaughn

(57) ABSTRACT

A positioning device to position, during in vehicle construction, a vehicle body component having at least one locating bore. The positioning device includes a locating pin having a conical end designed to be guided axially through a locating bore of the vehicle body component to centre and position the vehicle body component. The locating pin is mounted in a radially floating manner.

17 Claims, 5 Drawing Sheets

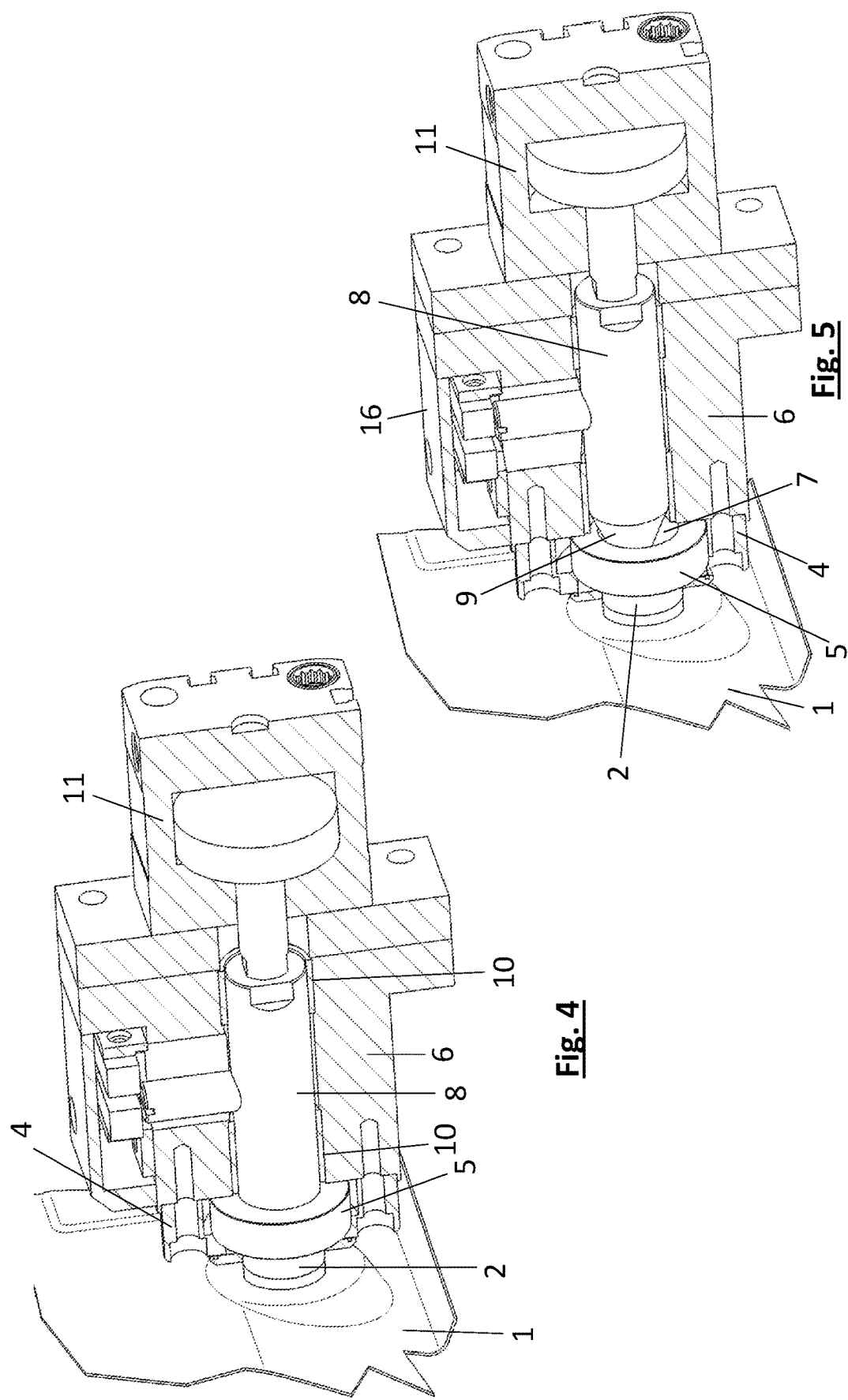

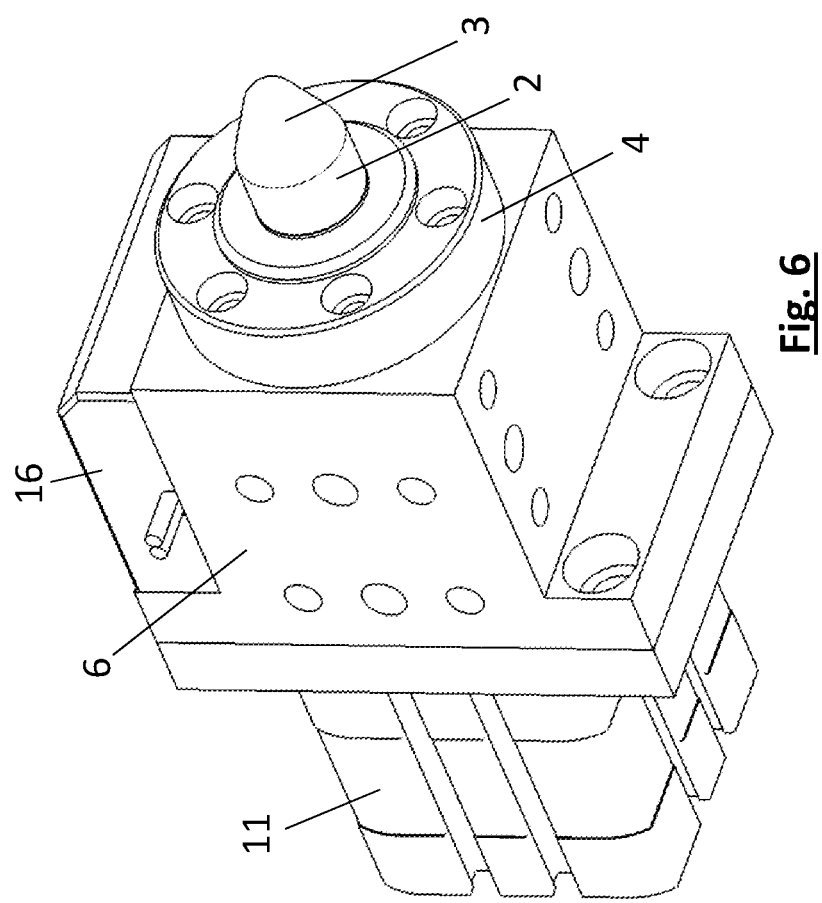

POSITIONING DEVICE

CROSS-REFERENCE TO RELATED APPLICATIONS

The present application claims priority 35 U.S.C. § 119 to European Patent Publication No. EP 18197206.8 (filed on Sep. 27, 2018), which is hereby incorporated by reference in its complete entirety.

TECHNICAL FIELD

Embodiments relate to a positioning device for positioning a vehicle body component with at least one locating bore in vehicle construction.

BACKGROUND

In many cases, automotive manufacture, in particular, vehicle body construction, involves thin-walled components. Such thin-walled components are usually sheet-metal parts, having to be precisely positioned, in particular, so that they can be welded, or in some other way joined, to other body components or body assemblies. The thin-walled components have at least one, but usually at least two, locating bores for this purpose. Locating pins on a positioning device are used to pass through these bores in the body parts and position the components which are to be connected to one another. The locating pins often have a conical end, making it easier to insert them into the bores and to centre the components by passing through the locating pins, which is why locating pins of this kind are also referred to as "centring pins". Positioning of the components in this way is often followed by steps involving the fixing or clamping of components in the course of further assembly and steps for joining to other body components.

For example, German Patent Publication No. DE 39 19 077 C1 discloses a device for the positionally defined clamping of a workpiece on a machining table with a workpiece holder on which the workpiece is detachably fastened and which is provided with centring openings that interact with centring pins which are correspondingly arranged on the machining table and project beyond said table, wherein a first group of centring openings and centring pins is provided which define the position of the workpiece holder in an X and Y direction.

European Patent Publication No. EP 0 911 112 A1 discloses a pressurizing medium-actuable combined centring and clamping device, in particular, for use in body construction within the automotive industry, having a pin-shaped centring part and a clamping part, wherein the centring part and the clamping part can be alternately driven in both directions: clamping and centring or releasing, one after the other by pressurizing medium pressure and the clamping part is mounted in and on the pin-shaped centring part.

The locating bores in the vehicle body components are in some cases later provided with sealing plugs in order to close these openings, in any event following the positioning of the components.

The problem is that when locating pins pass through the bores in thin-walled components during the course of positioning, the bores or the body components in the region of the bores are sometimes damaged. It is possible that later on, even after sealing plugs have been added, unwanted water ingress into the body can occur at locating bores in body components that have been damaged in this way.

SUMMARY

A problem addressed by embodiments is that of specifying an enhanced positioning device for positioning a body component with at least one locating bore in vehicle construction which particularly avoids damage to the body components in the region of the locating bores during positioning.

In accordance with embodiments, the problem is solved by a positioning device for positioning a body component with at least one locating bore in vehicle construction comprising a locating pin with a conical end that is designed to be guided axially through the locating bore in the body component in order to centre and position the body component, wherein the locating pin is mounted in a radially floating manner.

In accordance with embodiments, a locating pin with a conical end for centring and positioning a component is mounted in a radially floating manner. It has been shown that the locating bores in the positioned components are more badly damaged by a rigid embodiment of a locating pin. Particularly when the components are located multiple times during the vehicle assembly process, the locating bores become more and more widened and/or damaged when rigid locating pins are used. The consequence of this is greater dimensional inaccuracies or leaking of the body components. The radially floating bearing of the locating pins means that the body components can be accurately positioned, where necessary also positioned multiple times, and they are damaged less, if at all, during this process.

In accordance with embodiments, the term "bore" does not define the way in which the corresponding opening is produced, and thus, should be understood within the meaning of an opening through the component with a customarily round cross section.

In accordance with embodiments, the locating pin preferably has a cylindrical pin portion and is mounted in a radially floating manner in a holding ring. The holding ring has a slightly greater inner diameter than the outer diameter of the cylindrical pin portion. There is therefore "play" between the holding ring and the locating pin or the cylindrical pin portion of the locating pin.

In accordance with embodiments, it is particularly preferable for the locating pin to have a two-stage design and, in addition to the cylindrical pin portion, a cylindrical collar, wherein the cylindrical collar has a greater diameter than the diameter of the cylindrical pin portion. The holding ring is likewise of two-stage design, and the locating pin is radially mounted in this holding ring in a two-stage, radially floating manner. A first stage of the holding ring has a greater inner diameter for this purpose than the outer diameter of the cylindrical pin portion and a second stage of the holding ring has a greater inner diameter than the outer diameter of the cylindrical collar. There is therefore "play" between the first stage of the holding ring and locating pin and also between the second stage of the holding ring and outer diameter of the cylindrical collar.

In accordance with embodiments, the positioning device preferably comprises a base body, wherein the holding ring is fastened to the base body or is formed integrally with said base body, wherein the locating pin is fixed axially through the base body and/or through the holding ring. The locating pin may be moved and positioned substantially, at least axially, but preferably also radially, apart from the degrees of freedom based on the floating bearing, along with the base body.

In accordance with embodiments, the locating pin preferably has a recess in the form of an internal taper at its end opposite the conical end. The internal taper runs axially to this end of the locating pin into the inside of the locating pin, and preferably coaxially with the locating pin, about a centre axis shared with the locating pin.

In accordance with embodiments, the positioning device preferably comprises a locking pin, wherein the locking pin has a conical end, wherein the locking pin is axially displaceable with respect to the locating pin. The locking pin can therefore be displaced towards the locating pin, in particular so that the locking pin comes into contact with said locating pin.

In accordance with embodiments, the diameters of the internal taper of the locating pin and the conical end of the locking pin preferably fit together, so that the conical end can be received in the internal taper by fitting. This geometry of the two tapers also substantially determines the possible "play" or else the floating bearing between the locating pin and the attached collar, on the one hand, and the inner diameter of the holding ring, on the other, and can therefore be used to provide a desired play. If, for example, the diameter of the internal taper of the locating pin is smaller, the "play" is also smaller or else the radially floating movement of the locating pin is smaller.

In accordance with embodiments, the locking pin can be guided through a bore in the base body and the locking pin may be axially displaceable in relation to the base body, so displaced in the bore of the base body.

In accordance with embodiments, the locking pin is preferably mounted radially in the base body, in particular, in the bore of the base body, via two bearing bushes.

In accordance with embodiments, the locking pin can preferably be displaced via a pneumatic cylinder axially in relation to the locating pin and in relation to the base body. The pneumatic cylinder may be fastened to the base body.

DRAWINGS

Embodiments will be illustrated by way of example in the drawings and explained in the description hereinbelow.

FIG. 4 illustrates a three-dimensional representation in partial section of the positioning device of FIG. 3 in a first state.

FIG. 5 illustrates a three-dimensional representation in partial section of the positioning device of FIG. 3 in a second state.

FIG. 6 illustrates a three-dimensional representation of the positioning device of FIG. 2.

DESCRIPTION

Figure 1:
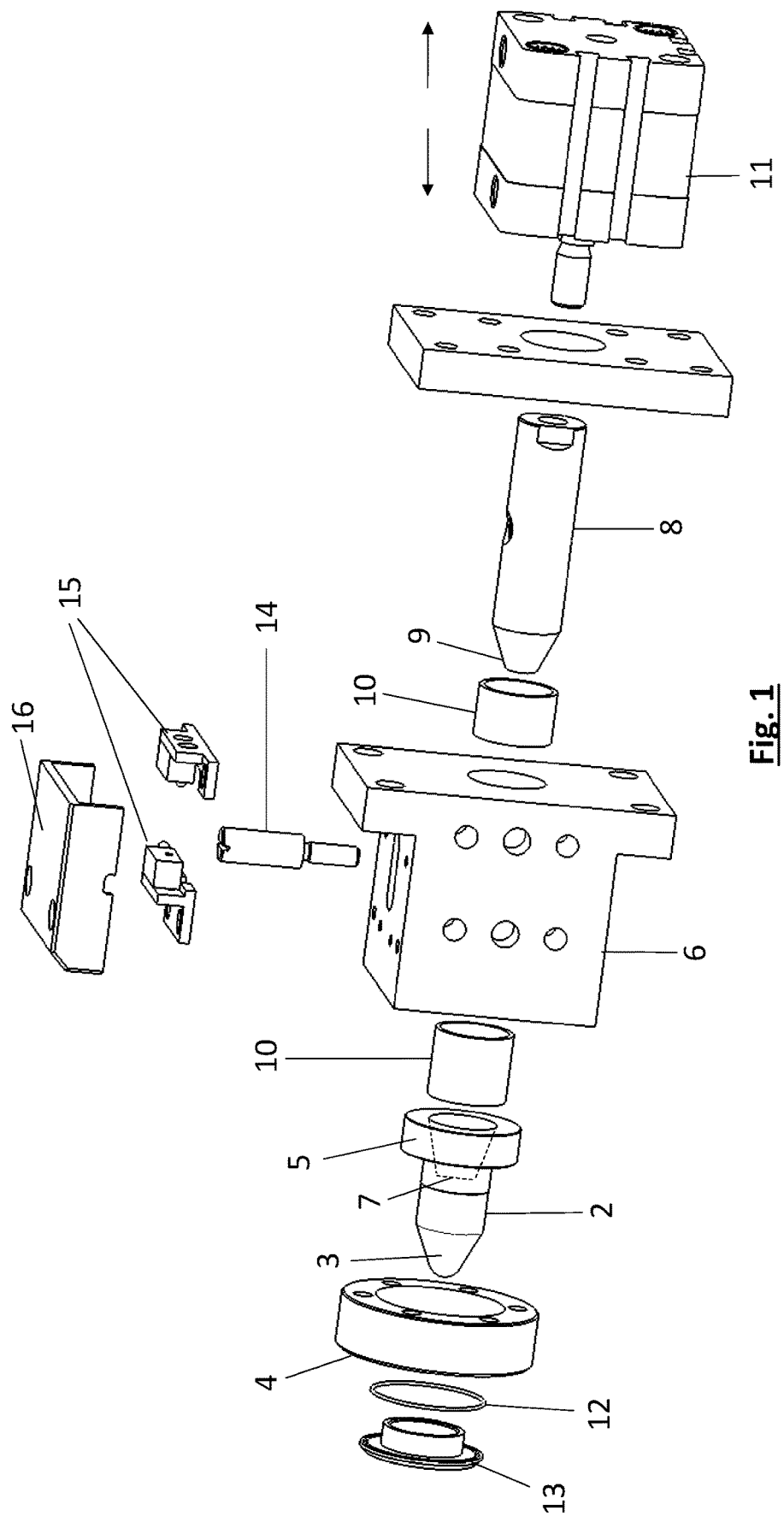
FIG. 1 illustrates an exploded view which shows a positioning device, in accordance with embodiments.

FIGS. 1-6 illustrate, in accordance with embodiments, a positioning device for positioning a body component 1 with a locating bore (see FIGS. 3-5) which comprises a locating pin 2 having a conical end 3 which is designed to be guided axially through the locating bore in the vehicle body component 1 to centre and position the vehicle body component 1.

The locating pin 2 is mounted in a holding ring 4 in a radially floating manner. The locating pin 2 has a cylindrical pin portion which exhibits a smaller outer diameter than the inner diameter of the holding ring 4. To be more precise, the locating pin 2 has an at least two-stage design which includes the cylindrical pin portion and a cylindrical collar 5. The cylindrical collar 5 has a greater diameter than the cylindrical pin portion. The locating pin 2 has an axial recess in the form of an internal taper 7 at its end opposite the conical end 3.

Figure 2:
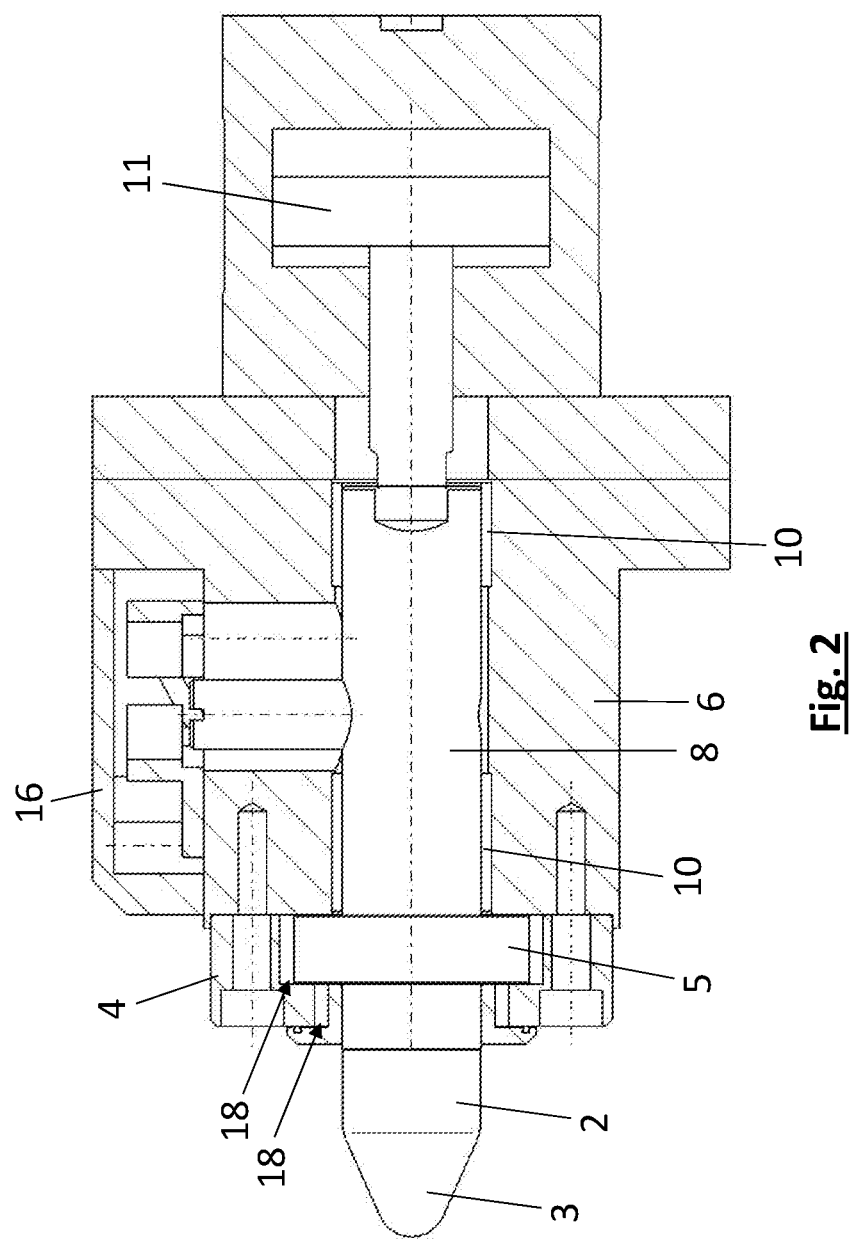
FIG. 2 illustrates a lateral sectional view of the positioning device of FIG. 1.

The positioning also comprises a holding ring 4 also having a two-stage design in order that the locating pin 2 is mounted in the holding ring 4 in a two-stage, radially floating manner. A first stage of the holding ring 4 has a greater inner diameter than the outer diameter of the cylindrical pin portion, and a second stage of the holding ring 4 has a greater inner diameter than the outer diameter of the cylindrical collar 5. As illustrated in FIG. 2, this means that play 18 exists between the first stage of the holding ring 4 and the locating pin 2 and also between the second stage of the holding ring 4 and the outer diameter of the cylindrical collar 5.

The positioning device further comprises a base body 6 to which the holding ring 4 is fastened thereto. The locating pin 2 is mounted axially through the base body 6 and the holding ring 4, as clearly illustrated in FIG. 2.

The positioning device additionally comprises a locking pin 8 having a conical end 9. The locking pin 8 is axially displaceable in respect of the locating pin 2.

The respective diameters of the internal taper 7 of the locating pin 2 and of the conical end 9 of the locking pin 8 correspond, i.e., fit together, so that the conical end 9 can be located in the internal taper 7 in a close-fitting manner. The locking pin 8 is guided through a bore in the base body 6 and is axially displaceable in respect of the base body 6. The locking pin 8 is radially mounted in the base body 6 via two bearing bushes 10. The bearing bushes 10 are arranged in the bore of the base body 6.

Via a pneumatic cylinder 11, the locking pin 8 can be axially displaced in respect of the locating pin 2 and in respect of the base body 6. The pneumatic cylinder 11 is fastened to the sidewall of the base body 6 or to an attachment plate connected to the base body 6.

In summary, therefore, the locating pin 2, having a diameter corresponding to the vehicle body component 1 being located, or the locating bore thereof, is fitted to the front side of the base body 6. The locating pin 2 has a fitted collar 5 at the rear end and, in addition, an internal taper 7 at this end. The locating pin 2 is secured in a radially floating manner with a holding ring 4 screwed to the front. The stepped bore of the front holding ring 4 is greater in the diameter to the locating pin 2 and also to the fitted collar 5 of the locating pin 2, where required. The width of the fitted collar 5 of the locating pin 2 is minimally smaller relative to the inner width of the holding ring 4. Consequently, the locating pin 2 can be freely moved radially in all directions.

Furthermore, a locking pin 8 with a taper 9 fitted to the front is guided in the base body 6 via bearing bushes 10. The taper angle corresponds to the internal taper 7 of the locating pin 2. This locking pin 8 is pushed forwards or backwards (in the direction of the arrows illustrated in FIG. 1) via a pneumatic cylinder 11 fitted at the back.

If the built-in locking pin 8 with the taper 9 fitted to the front is pushed backwards, as illustrated in FIG. 5, the front locating pin 2 can be freely moved radially. If the built-in locking pin 8 is pressed forwards by the force of the pneumatic cylinder 11 attached at the rear, as illustrated in FIG. 4, the locating pin 2 is moved by the two tapers 9 and 7 into the central position and locked.

Via the locating pin 2, the component 1 received is likewise moved into the correct position. This is followed by further clamping steps for the component 1.

Via a screwed-in metal pin used as a metal indicator 14 in the locking pin 8, the positioning device can sense the position of the metal indicator 14 and therefore of the locking pin 8 and of the locating pin 2 via the two inductive proximity switch sensors 15 attached to the top of the base body 6, so that a report on the position of the locating pin 2 (so-called INI query) can be given to a system control process. The sensors 15 are protected via a cover 16 as a dirt cover cap and can be incorporated in different systems in the system controls.

To prevent the positioning device from becoming dirty, a dirt cover cap 13 with a sealing ring 12 is pressed onto the locating pin 2 at the front.

The dirt cover cap 13 therefore moves with the locating pin 2 and covers the "play" that exists between the locating pin 2 and the holding ring 4 to guard against dirt. This means that no "play" can be seen in FIG. 6 either. The dirt cover cap 13 therefore moves along with the locating pin 2 relative to the holding ring 4, for example, the dirt cover cap 13 slides on the (front) surface of the holding ring 4 or a seal or a slip ring is arranged therebetween.

As mentioned herein, the stepped bore of the front holding ring 4 is greater in the diameter to the locating pin 2 and also to the fitted collar 5 of the locating pin 2, where required. In an embodiment with dirt cover cap 13, as depicted in FIG. 2, this may be designed as follows. Since the dirt cover cap 13 in this case is pressed onto the locating pin 2 and, for reasons of stability, projects into the inner diameter of the front holding ring 4, the bore in this case must be made larger by the wall thickness of the "shaft" of the dirt cover cap 13 enclosing the locating pin 2, so that "play" also exists for the component 2, 5 in the region of the front holding ring 4. Having the shaft of the dirt cover cap 13 projecting into the inner diameter of the holding ring 4 is only one exemplary embodiment. A dirt cover cap could also be attached or secured, in particularly pressed onto the locating pin 2 only in the region in front of the holding ring 4.

Figure 3:
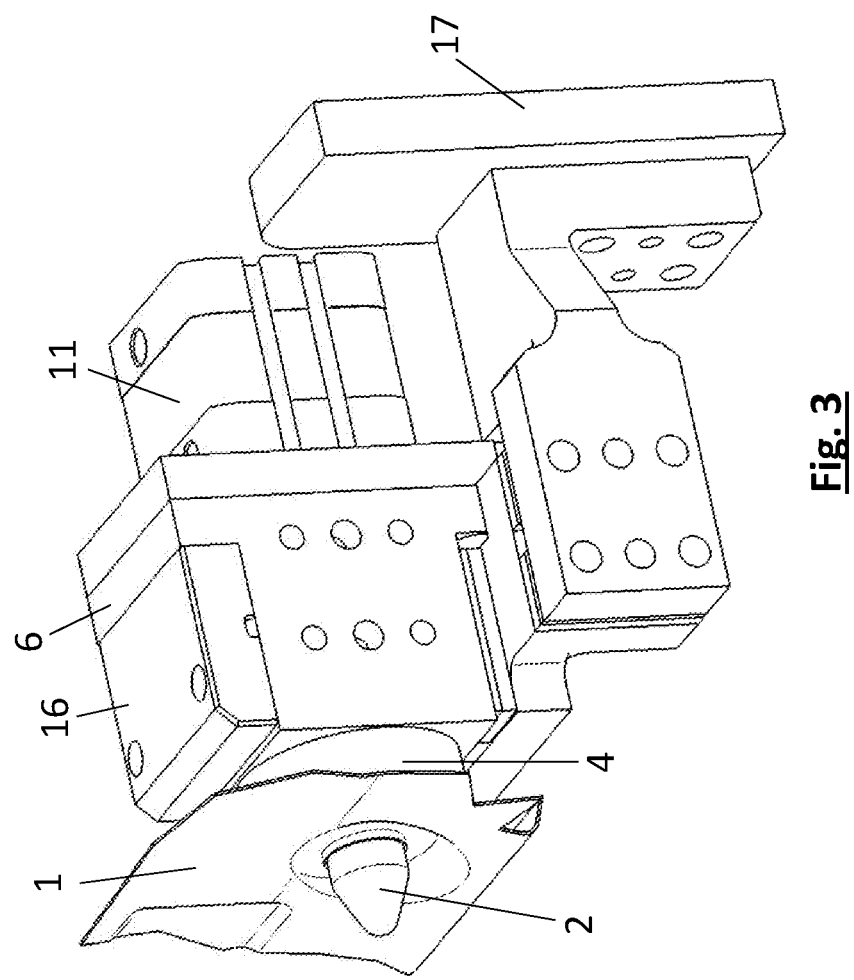
FIG. 3 illustrates a three-dimensional representation of the positioning device of FIG. 2, with a vehicle body component to be positioned.

Threaded bores and locating bores for securing in a device, for example to a grab 17 or a grab frame, are introduced on the side and also bottom of the base body 6 (see FIG. 3).

In accordance with embodiments, the positioning device may, for example, be used on framer gates for side frames with locating holes in body construction or on robot-controlled grab frames for components with locating holes in body construction and for a wide variety of thin-walled components with locating holes which are not to be damaged and the locating holes thereof, in particular, provided with sealing plugs.

The terms "coupled," "attached," "fastened," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 vehicle body component
2 locating pin
3 conical end
4 holding ring
5 cylindrical collar
6 base body
7 internal taper
8 locking pin
9 conical end
10 bearing bush
11 pneumatic cylinder
12 sealing ring
13 cover cap
14 metal indicator
15 sensor
16 cover
17 grab
18 play

What is claimed is:

1. A positioning device for positioning, during vehicle construction, a vehicle body component having at least one locating bore, the positioning device comprising:
   a holding ring; and
   a locating pin, mounted in a radially floating manner in the holding ring, having a a cylindrical pin portion and a conical end configured to be guided axially through the at least one locating bore in order to centre and position the vehicle body component, wherein the holding ring has a greater inner diameter than an outer diameter of the cylindrical pin portion.

2. The positioning device of claim 1, wherein the locating pin has a two-stage design comprising a cylindrical pin portion and a cylindrical collar, the cylindrical collar having a greater diameter than the diameter of the cylindrical pin portion.

3. The positioning device of claim 2, wherein the holding ring comprises a two-stage design including a first holding ring stage and an second holding ring stage having an inner diameter that is greater than the inner diameter of the first holding ring stage.

4. The positioning device of claim 2, wherein the locating pin is radially mounted in the holding ring in a two-stage, radially floating manner, in which the first holding ring stage has a greater inner diameter than the outer diameter of the cylindrical pin portion, and the second holding ring stage has a greater inner diameter than the outer diameter of the cylindrical collar.

5. The positioning device of claim 1, further comprising a base body to which the holding ring is fastened.

6. The positioning device of claim 5, wherein the locating pin comprises an internal taper that defines a recess at an end that is opposite to the conical end.

7. The positioning device of claim 5, further comprising a locking pin having a conical end, wherein the locking pin is axially displaceable with respect to the locating pin.

8. The positioning device of claim 7, wherein the diameter of the internal taper of the locating pin and the outer diameter of the conical end of the locking pin correspond to each other.

9. The positioning device of claim 7, wherein the conical end of the locking pin is configured for receipt in the recess defined by the internal taper of the locating pin.

10. The positioning device of claim 7, wherein the locating pin is fixed axially through the base body and/or the holding ring.

11. The positioning device of claim 7, wherein the base body comprises a bore through which the locking pin is guided, and the locking pin is axially displaceable in relation to the base body.

12. The positioning device of claim 7, further comprising bearing bushes configured to facilitate radially mounting of the locking pin in the base body.

13. The positioning device of claim 7, further comprising a pneumatic cylinder configured to axially displace the locking pin relative to the locating pin.

14. A positioning device for positioning, during vehicle construction, a vehicle body component having a locating bore, the positioning device comprising:
- a locating pin having a conical end configured to be guided axially through the locating bore in order to centre and position the vehicle body component, the locating pin having a two-stage design including a cylindrical pin portion and a cylindrical collar having a greater diameter than the diameter of the cylindrical pin portion; and
- a holding ring into which the locating pin is mounted in a radially floating manner, the holding ring having a two-stage design including a first holding ring stage and an second holding ring stage having an inner diameter that is greater than the inner diameter of the first holding ring stage,
wherein the locating pin is radially mounted in the holding ring in a two-stage, radially floating manner, in which the first holding ring stage is to receive the cylindrical pin portion and the second holding ring stage is to receive the cylindrical collar.

15. A positioning device for positioning, during vehicle construction, a vehicle body component having a locating bore, the positioning device comprising:
- a locating pin having a conical end configured to be guided axially through the locating bore in order to centre and position the vehicle body component, and a distal end having an internal taper that defines a recess;
- a base body having a bore extending longitudinally therethrough, the base body being configured to receive at least the distal end of the locating pin; and
- a locking pin having a conical end, the locking pin extending through the bore such that the conical end is received in the recess of the internal taper, the locking pin being axially displaceable with respect to the locating pin.

16. The positioning device of claim 15, wherein the locating pin is fixed axially through the base body and/or the holding ring.

17. The positioning device of claim 15, further comprising a pneumatic cylinder configured to axially displace the locking pin relative to the locating pin.

* * * * *